United States Patent Office 3,015,950
Patented Jan. 9, 1962

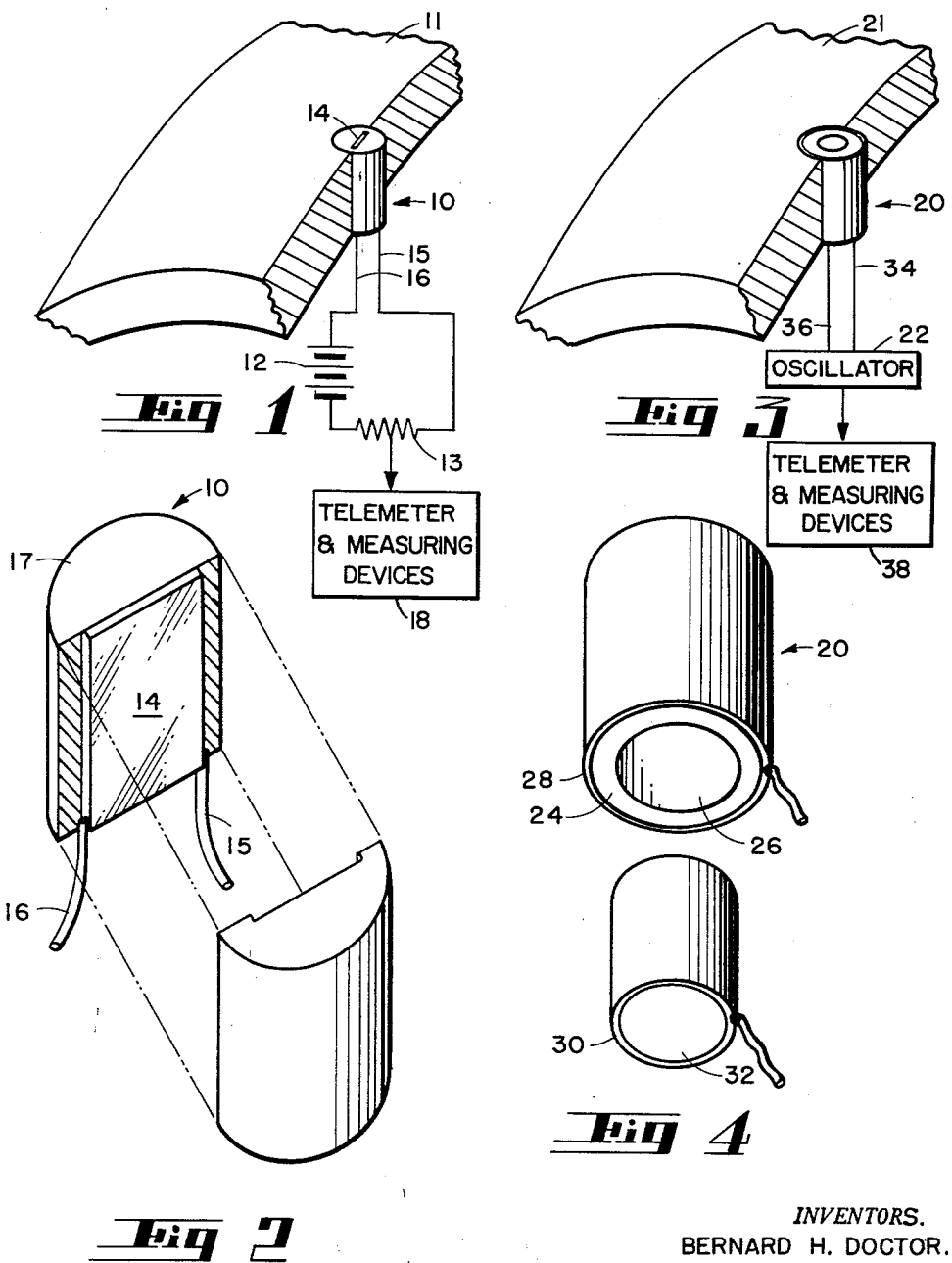

3,015,950
EROSION SENSOR
Bernard H. Doctor, Cincinnati, and James V. O'Bryan, Springdale, Ohio, assignors to Avco Corporation, Cincinnati, Ohio, a corporation of Delaware
Filed Feb. 23, 1960, Ser. No. 10,502
5 Claims. (Cl. 73—86)

This invention relates to erosion sensors and, more particularly, to apparatus for detecting the depth of erosion of a body of material by means of novel electrical elements.

Briefly stated, this invention comprises an electrical sensor element incorporated into tthe skin of a body under test, the electrical sensor element being made substantially of the same material as the body but having electrical properties which respond to a change in the length of the sensor element, due to the simultaneous erosion of the body and the element. This novel sensor translates instantaneous volumetric data to useful electrical information such that erosion or burning of a material may be observed. As will be seen, this invention may find utility in many areas. For example, the sensor elements may be inserted into the skin of an aircraft or missile, the response from the element being proportional to the existing thickness of the skin and the length of the sensor, thereby yielding instantaneous data as to existing skin thickness. These sensors may also be used for flight tests of supersonic aircraft to empirically determine the required thickness, size, and shape for obtaining minimum and uniform deterioration. Also, such sensor elements may be used for measuring wear on a brake surface, such as found in automobiles and aircraft, or for measuring the erosion of the interior of a furnace, or for many other uses.

The primary object of this invention is to provide means enabling the instantaneous and progressive measurement of the burn or erosion depth of a body subjected to high temperatures.

Another object of this invention is to provide improved sensor elements for measuring the volumetric change of a body into electrical data suitable for telemetering, the sensor elements being constructed of substantially the same material as the body under test but having molded therein electrical elements which respond proportionally to the simultaneous erosion of the body and the sensor element.

Another object of this invention is to provide a sensor element for determining the thickness of a body under test, said sensor element having electrical properties proportional to its length and being imbedded in said body with its lengthwise dimension corresponding to the thickness of said body so that erosion of said body and element occurs simultaneously.

For further objects and for a more complete understanding of the precise nature of this invention, reference should now be made to the following specification and to the accompanying drawing, in which:

FIGS. 1 and 2 illustrate a resistive sensor element; and
FIGS. 3 and 4 illustrate a capacitive sensor element.

FIG. 1 illustrates a resistive sensor element 10 imbedded in a body 11 of material, one end of the sensor being flush with the surface which is under test for erosion. For the purposes of this description, the body 11 has been schematically depicted as the skin of an aircraft or missile. It is to be understood, however, that the body may also be the interior lining of a furnace or brake shoe and that the material may be of the ablation or heat sink type.

As is known by those skilled in the art, missiles and similar supersonic aircraft are subject to severe surface heating during high-speed flight through the atmosphere. Their surfaces may heat unevenly, depending upon the particular shape involved, and thus reduce performance and reliability. By means of the erosion sensor element used in the manner illustrated in FIG. 1, a practical system has been devised for measuring the erosion by ablation or wear due to the heating at various points on the surface of the body. This information provides the necessary data for empirically determining optimum sizes and shapes for the body.

As will be seen, the sensor element 10 has resistive electrical properties which change in proportion to the degree of erosion of the element. By connecting a battery 12 or other constant voltage source in circuit with the resistive sensor element 10 and a load resistor 13, the degree of simultaneous erosion of the body 11 and the sensor element 10 may be easily measured. Conventional telemetering and resistance measuring equipment 18 may be used for transmitting the information from the load resistor 13 to remote observation posts.

FIG. 2 shows an exploded view of a typical construction of the resistive sensor element 10. The sensor element 10 is comprised of a conducting film 14 of resistance material having a length at least equal to the depth to which it is desired to measure the erosion of the body 11 and, as illustrated, the sensor length is equal to the thickness of the body. Two conductive leads 15 and 16 are secured by bonding or other suitable method to one end of the film, and the film, together with the bonded portions of the leads, is insert molded into a cylindrical casing 17. The casing 17 is made of the same material as that of the body 11 and is fixedly incorporated therein. In the form illustrated it is assumed that the body 11 and the casing 17 are made of non-conductive materials at direct currents; however, if this material is normally conductive, then a low voltage isolation film must be incorporated to protect the electrical circuit.

In operation, current from the battery 12 or other constant voltage source flows across the film 14 of resistance material through the load resistor 13 in series and develops a drive voltage proportional to the instantaneous resistance of the sensor. Now, if the sensor is consumed or worn away, the length of the film 14 is reduced and, hence, its resistance is increased, due to the reduced area of the conductive surface. This change in resistance, calibrated in terms of sensor length or body thickness, results in a change in voltage across load resistor 13 and this may be relayed by conventional telemetry techniques to supply instantaneous data to some remote station.

These sensors may be quite small and, in practice, need be only about one-eighth inch in diameter, and the incorporation of a reasonable number will not appreciably affect the flight or wear characteristics of the body, particularly since the sensors are made almost entirely of the same material as the body 11. An important feature of this construction is that the wire leads 15 and 16 connected to the end of the sensor are not affected by erosion and hence do affect the configuration of the surface of the body exposed to erosion as the surface wears away.

A second type of sensor 20, illustrated in FIGS. 3 and 4, presents a similar outward appearance but operates on a capacitance principle. Thus, the sensor 20 is similarly imbedded into a body of material 21 and is connected in an appropriate electrical circuit to provide an indication as to erosion. Instead of the circuitry of FIG. 1, the sensor element 20 constitutes a variable condenser in an oscillator 22 to vary the frequency of generations of the oscillator as the sensor element erodes. The variable frequency, which is a function of sensor length or body thickness, may then be telemetered and measured by conventional telemetering and frequency measuring apparatus 38 to a remote station.

As seen best in FIG. 4, the capacitive sensor element 20 comprises a cylinder 24 constructed of the same material as that of the body 21 having a central bore 26. A first conductive electrode 28, comprised of a film of copper or other appropriate conductive material, is molded or bonded onto the outer surface of the cylinder, while the second conductive electrode comprises a similar film 30 of copper or other appropriate conductive material bonded or molded onto a cylinder 32. The cylinder 32 is also made of the same material as the body 21, and the overall diameter of the cylinder 32 and film 30 is equal to the diameter of the bore 26 in which it is secured by any suitable known technique. Leads 34 and 36 are bonded to the copper films 28 and 30, respectively, at the ends thereof remote from the eroding surface of the body 21.

In operation, subjecting the body 21 to heat causes simultaneous erosion of the body and the sensor 20. Since the capacity is dependent on surface area, erosion of one end of the sensor will decrease its capacity as a function of the length of the sensor or as a function of body thickness. The changing capacity results in a frequency change in the oscillator, the output of which may be calibrated in terms of thickness and telemetered to a remote location.

It is to be understood that capacitive and resistive elements may be used in combination without departing from the spirit of this invention which relates broadly to the incorporation of such elements into surfaces for the purpose of enabling high temperature wear measurements. Also, we do not intend to limit this invention to the particular shapes disclosed. For example, the elements need not be cylindrical in shape but may be in any shape convenient to manufacture. Furthermore, the second electrode of the capacitive sensor 20 need not be constructed as illustrated, but may be made entirely of copper or other conductive material, provided the erosion rate of the copper is approximately the same as the material of the body being measured.

Many variations and adaptations within the spirit of this invention will at once become apparent to persons skilled in the art. It is intended, therefore, that this invention be limited only by the appended claims as interpreted in the light of the prior art.

What is claimed is:

1. In a system for measuring the erosion of the surface of a body, the combination comprising: an erosion sensor consisting of at least one film of material having electrical properties formed to provide an electrical impedance element having a length at least equal to the depth of erosion of said body to be measured, spaced apart electric current-carrying wires electrically connected to said impedance element at one end thereof, said impedance element being secured to a form composed of the same material as said body, said wires extending at one end of said form, the other end of said impedance element being flush with the other end of said form; means securing said erosion sensor in said body with said other end of said impedance element flush with said surface of said body, whereby said surface and said other end of said impedance element erode simultaneously; a source of electrical energy connected to said impedance element through said wires; and means for measuring the change in impedance of said element due to erosion whereby an instantaneous indication of the depth of erosion is provided.

2. In a system for measuring the erosion of the surface of a body, the combination comprising: an erosion sensor consisting of a film of material having electrical resistance properties, spaced apart electrical current-carrying wires electrically connected to opposite edges of said film at one end thereof, said film being molded into a form composed of the same material as said body, said wires extending through one end of said form, the other end of said film being flush with the other end of said form; means securing said form in said body with said other end of said film being flush with said surface of said body whereby said surface and said film erode simultaneously; a source of electrical energy connected to said film through said wires; and means for measuring the change in resistance of said film due to erosion whereby an instantaneous indication of the depth of erosion is provided.

3. In a system for measuring the erosion of the surface of a body, the combination comprising: an erosion sensor consisting of an elongated, rectangular film of material having electrical resistance properties, said film having a length at least equal to the depth of erosion of said body to be measured, electrical current-carrying wires connected to opposite edges of said film at one end thereof, said film being molded into and supported by a cylindrical form composed of the same material as said body, said wires extending through one end of said form, the other end of said film being flush with the other end of said form; means securing said sensor in said body with said other end of said form being flush with said surface of said body whereby said surface and said erosion sensor erode simultaneously; a source of electrical energy connected to said film through said wires; and means for measuring the change in resistance of said film due to erosion whereby an instantaneous indication of the depth of erosion is provided.

4. In a system for measuring the erosion of the surface of a body, the combination comprising: an erosion sensor consisting of first and second films of conducting material fixedly spaced apart on forms composed of the same material as said body to provide a capacitive impedance element, said films and forms having a length at least equal to the depth of erosion of said body to be measured, and an electric current-carrying wire connected to each of said first and second films at one end thereof, the other end of said films being flush with one end of said forms; means securing said forms in said body with said other end of said films being flush with said surface of said body, whereby said surface and said other end of said impedance element erode simultaneously; a source of electrical energy connected to said impedance element through said wires; and means for measuring the change in capacitance in said impedance element due to erosion whereby an instantaneous indication of the depth of erosion is provided.

5. In a system for measuring the erosion of the surface of a body, the combination comprising: an erosion sensor consisting of first and second elongated films of conducting material spaced apart to provide a capacitive impedance element, said impedance element having a length at least equal to the depth of erosion of said body to be measured, and an electric current-carrying wire connected to each of said first and second films at one end thereof, said first film being secured to the surface of a cylinder having a longitudinal bore, said second film being secured to a second cylinder, the diameter of said second cylinder with said film thereon being equal to the diameter of said bore, said second cylinder with said film thereon being secured within said bore, said cylinders being composed of the same material as said body, said wires extending from one end of said cylinders, the other end of said capacitive impedance element being flush with the other end of said cylinders; means securing said erosion sensor in said body with said other end of said capacitive impedance element being flush with said surface of said body, whereby said surface and said other end of said impedance element erode simultaneously; a source of electrical energy connected to said impedance element through said wires; and means for measuring the change in capacity in said capacitive impedance element due to erosion whereby an instantaneous indication of the depth of erosion is provided.

References Cited in the file of this patent

UNITED STATES PATENTS

| | | |
|---|---|---|
| 1,811,765 | Snelling | June 23, 1931 |
| 2,915,305 | Craig | Dec. 1, 1959 |